United States Patent [19]

Kuhn et al.

[11] 4,002,864
[45] Jan. 11, 1977

[54] ENCLOSED CIRCUIT INTERRUPTER WITH INTERLOCKED SAFETY BARRIER

[75] Inventors: Edmund W. Kuhn, Pittsburgh; William P. Matty, Jr., Bethel Park; Alan G. McGuffie, Pittsburgh, all of Pa.

[73] Assignee: Westinghouse Electric Corporation, Pittsburgh, Pa.

[22] Filed: Apr. 2, 1975

[21] Appl. No.: 564,575

[52] U.S. Cl. ............................ 200/50 AA; 317/103
[51] Int. Cl.² ............................................ H01H 9/20
[58] Field of Search ............ 200/50 A, 50 AA, 330; 317/103

[56] References Cited

UNITED STATES PATENTS

| | | | |
|---|---|---|---|
| 2,777,024 | 1/1957 | West | 200/50 AA |
| 2,851,549 | 9/1958 | Keller et al. | 200/50 AA |
| 3,005,064 | 10/1961 | Baird et al. | 200/50 AA |
| 3,288,956 | 11/1966 | Jencks et al. | 200/50 AA |
| 3,681,545 | 8/1972 | Cellerini et al. | 200/50 AA |
| 3,749,862 | 7/1973 | Wilson et al. | 200/50 AA |
| 3,783,209 | 1/1974 | Cleaveland et al. | 200/50 AA |
| 3,842,321 | 10/1974 | Caton | 200/50 AA X |

*Primary Examiner*—James R. Scott
*Attorney, Agent, or Firm*—R. E. Converse

[57] ABSTRACT

A circuit interrupter including a drawout unit mounted within a sealable enclosure and operable between engaged and disengaged positions. A removable conductive safety barrier at ground potential is mounted on the front of the drawout unit and prevents any human contact with components at high potential. An interlock prevents removal of the safety barrier unless the drawout unit is in the fully levered out position. A hinged plate is operated by replacement of the safety barrier to allow the drawout unit to be operated to the engaged position.

3 Claims, 7 Drawing Figures

ENCLOSED CIRCUIT INTERRUPTER WITH INTERLOCKED SAFETY BARRIER

CROSS-REFERENCES TO RELATED APPLICATIONS

This invention is related to U.S. Pat. Application Ser. No. 564,574, entitled "Enclosed Circuit Interrupter With Door Mounted Control Handle Mechanism" filed Apr. 2, 1975, by W. Paul Matty and Alan G. McGuffie; U.S. Pat. Application Ser. No. 564,573, entitled "Draw-Out Type Circuit Interrupter With Modular Construction" filed Apr. 2, 1975, by Edmund W. Kuhn, Joseph D. Findley, Jr., and J. L. Uber; U.S. Pat. Application Ser. No. 564,576, entitled "Enclosed Circuit Interrupter With Improved Fuse Assembly" filed Apr. 2, 1975, by Edmund W. Kuhn and J. L. Uber; U.S. Pat. Application Ser. No. 564,577, entitled "Drawout Type Circuit Interrupter With Interlocked Levering Mechanism" filed Apr. 2, 1975, by Edmund W. Kuhn and Alan G. McGuffie; and U.S. Pat. No. 3.923,197 entitled "Gasket Assembly For Enclosed Electrical Apparatus" issued Dec. 2, 1975 to Edmund W. Kuhn. All of the above-mentioned U.S. Pat. Applications are assigned to the assignee of the present application.

BACKGROUND OF THE INVENTION

1. Field of the Invention

The invention relates generally to electrical apparatus, and more particularly, to enclosed circuit interrupters of the drawout type.

2. Description of the Prior Art

Circuit interrupters for industrial or electric utility applications must often operate in harsh environments where they are subject to moisture, dust or other contaminants. For these applications, drawout type circuit interrupters are often provided wherein the circuit interrupter is removably mounted within an enclosure. For example, the type of automatic circuit breaker known as a network protector is roller mounted upon rails within a sealed enclosure. Maintenance procedures are performed by rolling out the circuit breaker to disconnect it from the source of high voltage. However, in prior art drawout type circuit breakers, it was often possible to remove panels from the circuit breaker or otherwise to gain access to components at high potential before the circuit breaker was disconnected from the high voltage source. Improper maintenance procedures or a dropped tool sometimes caused a serious accident under these circumstances, producing injury to maintenance personnel and damage to the equipment. Thus, it would be desirable to provide a circuit breaker surrounded by a protective covering which would prevent access to any components at high potential until the circuit breaker had been disconnected from the source of high voltage.

SUMMARY OF THE INVENTION

In accordance with the principles of the present invention, there is provided an enclosed circuit interrupter comprising an enclosure, a drawout type circuit breaker movably mounted within said enclosure and operable between connected and disconnected positions, a removable conductive safety barrier at ground potential attached to the front of the circuit breaker preventing access to interior components of the circuit breaker, and interlock means attached to the circuit breaker and the barrier to permit removal of the barrier when the circuit breaker is in a position disconnected from sources of high potential and to prevent removal of the barrier when the circuit breaker is in a position other than a disconnected position.

DESCRIPTION OF THE PREFERRED EMBODIMENT

Throughout the drawings corresponding reference characters refer to corresponding parts.

Figure 1:
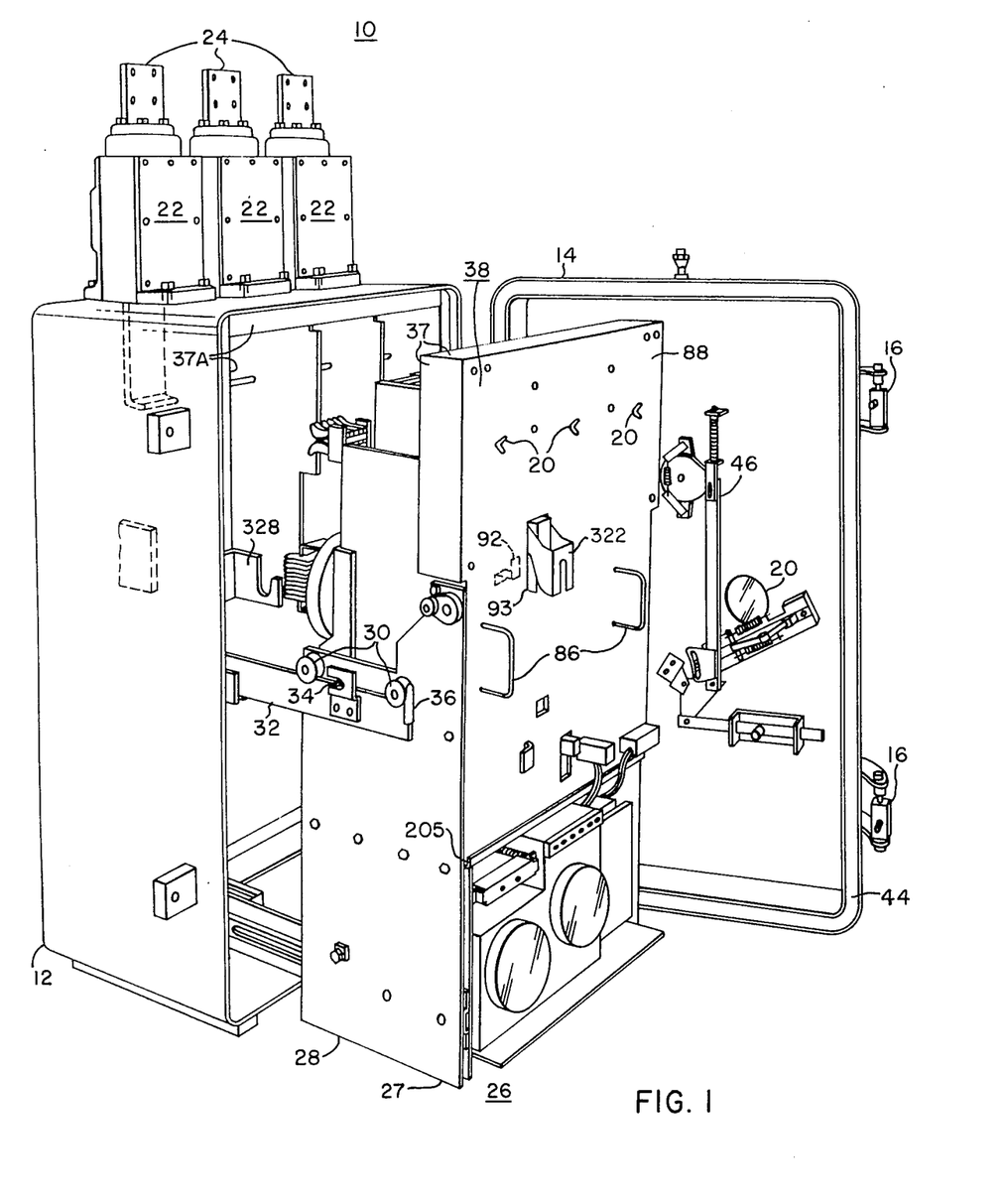
FIG. 1 is a perspective view of a network protector employing the principles of the present invention, with the automatic circuit breaker shown rolled out on rails from the enclosure.

Referring now to the drawings, there is shown in FIG. 1 a network protector 10 constructed in accordance with the principles of the present invention. A steel enclosure 12 is provided with a door 14 secured to the enclosure 12 by four hinged fasteners 16. A control handle 18 extends through the door and serves to manually operate the network protector. The door 14 is provided with a viewing window 20 through which to observe a flag indicating the position of the network protector contacts. Mounted on top of the enclosure 12 are three fuse assemblies 22 which include terminals 24 adapted for connection to cables supplying customer loads. The fuse assemblies 22 are more completely described in the aforementioned copending U.S. Pat. Application Ser. No. 564,576, entitled "Enclosed Circuit Interrupter With Improved Fuse Assembly."

The network protector 10 includes a drawout unit 26 supported by a main support frame 27 at ground potential. The main support frame 27 includes two side support plates 28 connected by welded steel channel members 40 and 42 shown more clearly in FIGS. 2 and 3. The two side support plates 28 (only one of which is visible in FIG. 1) include rollers 30 supported by collapsible extension rails 32. The drawout unit 26 is shown in FIG. 1 in the fully rolled out position. The travel of the drawout unit 26 on extension rails 32 is limited by the engagement of the front roller 30 with a stop pin 36. In this position the drawout unit 26 is completely disengaged from any source of high potential. A removable steel protective barrier 38 covers the upper part of the drawout unit 26 between the side plates 28. The protective barrier 38 comprises a pair of handles 86, three quarter-turn fasteners 20 mounted upon a flat steel plate 88 and three glass polyester baffles 37. When the drawout unit is in the connected position as shown in FIG. 3, the baffles 37 seat against flanges 37A of the enclosure 12 to contain any arcing products produced by operation of the network protector. Welded to the reverse side of the steel plate 88 is a Z-shaped catch or interlock bracket 92. The plate 88 includes an aperture 93 which fits over the shutter and provides access for the operating crank.

A gasket 44 is mounted on the interior surface of the door 14 to form a water-tight seal against the edge of the enclosure 12 when the door 14 is closed and fastened. The gasket 44 is more completely described in the aforementioned U.S. Pat. No. 3,923,197 entitled "Gasket Assembly For Enclosed Electrical Apparatus". A control mechanism 46 is mounted on the interior surface of the door 14 and is connected to the handle 18. The control mechanism 46 is more completely described in the aforementioned copending U.S. Pat. Application Ser. No. 564574, entitled "Enclosed Circuit Interrupter With Door Mounted Control Handle Mechanism".

Figure 2:
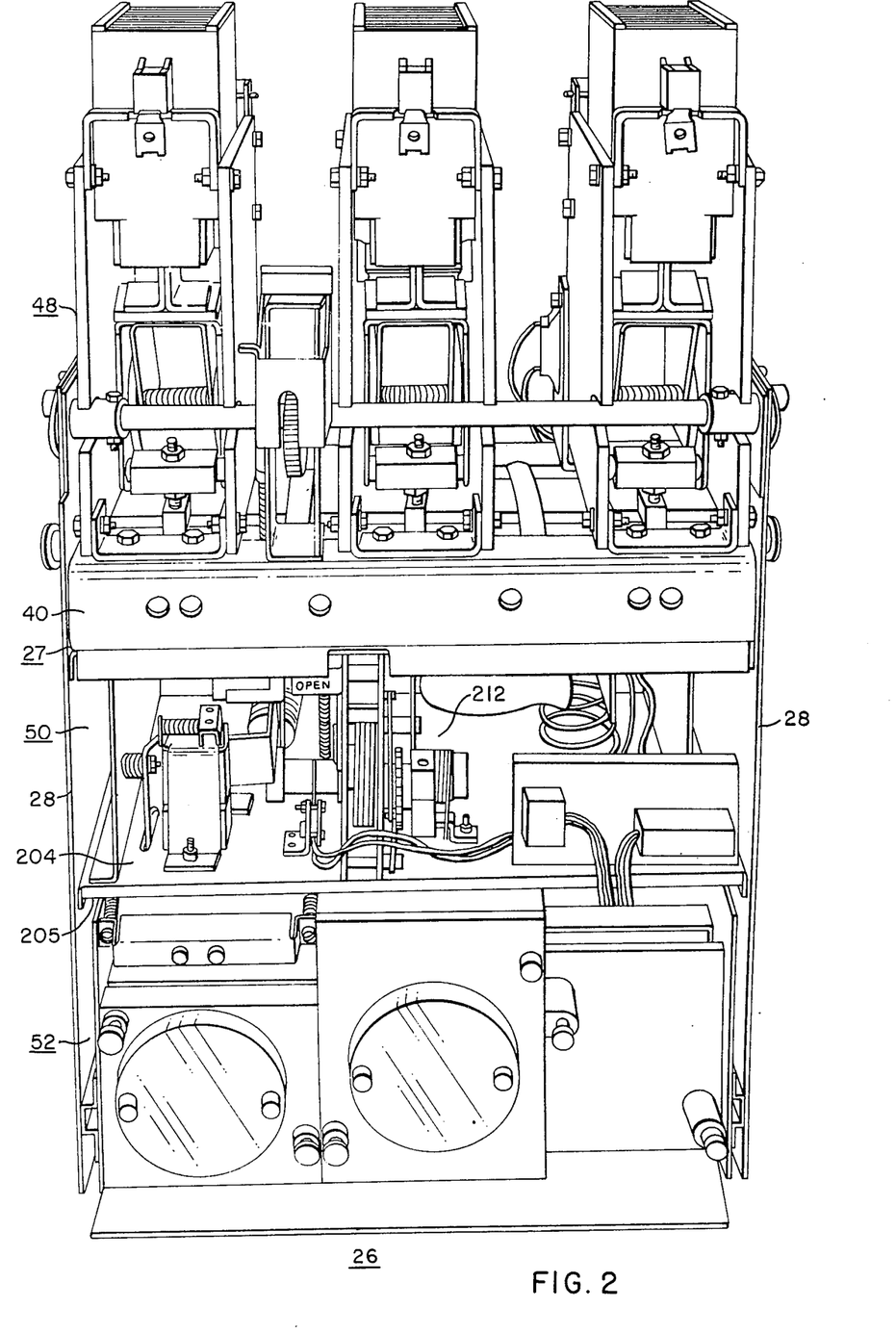
FIG. 2 is a front perspective view of the circuit breaker shown in FIG. 1, with the protective barrier removed.
Figure 3:
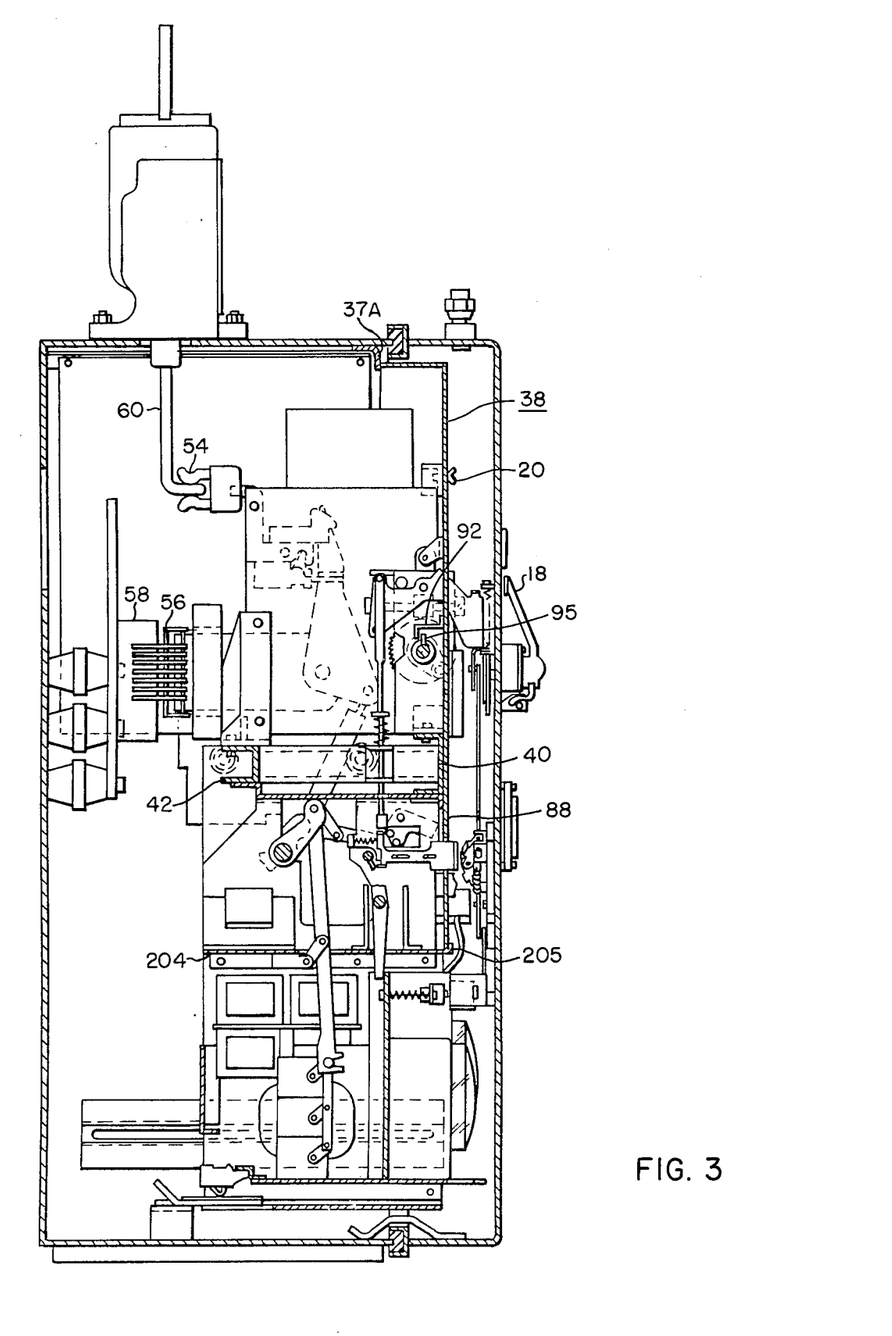
FIG. 3 is a sectional view of the network protector shown in FIGS. 1 and 2, with the circuit breaker shown in a levered in connected position.

Referring now to FIGS. 2 and 3, the drawout unit 26 includes three modules 48, 50, and 52. The module 48 is the interrupter module and includes all of the drawout unit components which are connected to sources of high potential. All load current through the drawout unit 26 flows through the interrupter module 48. The module 50 is the mechanism module and contains a motor charged spring driven mechanism 212 which serves to operate the current carrying components of the interrupter module 48. The control module 52 contains components responsive to both manual operation and to electrical conditions upon the circuit being controlled to command the mechanism module 50 to perform the proper opening or closing operations upon the interrupter module 48. The modular construction of the drawout unit 26 is more completely described in the aforementioned U.S. Patent Application Ser. No. 564,573, entitled "Draw-Out Type Circuit Interrupter With Modular Construction".

The protective barrier 38 is secured to the front of the drawout unit 26 by inserting the lower edge of the steel plate 88 upon the bottom pan 204 of the mechanism module 50, behind the lip 205 while the drawout unit 26 is in a levered-out position. The barrier 38 is then tilted forward over the shutter and up against the front of the drawout unit 26. The quarter turn fasteners 20 are then threaded into the sockets of the drawout unit 26.

The interrupter module 48 includes load disconnect structures 54 and line disconnect structures 56. When the drawout unit 26 is rolled into the enclosure and levered into a completely engaged position as in FIG. 3, the line disconnect structures 56 engage line terminals 58 mounted in the enclosure 12 which are electrically connected to the secondary windings of a network transformer. The load disconnect structures 54 engage load terminals 60 mounted at the interior top of the enclosure 12 and connected to the secondary network from which customer services are supplied.

Figure 4:
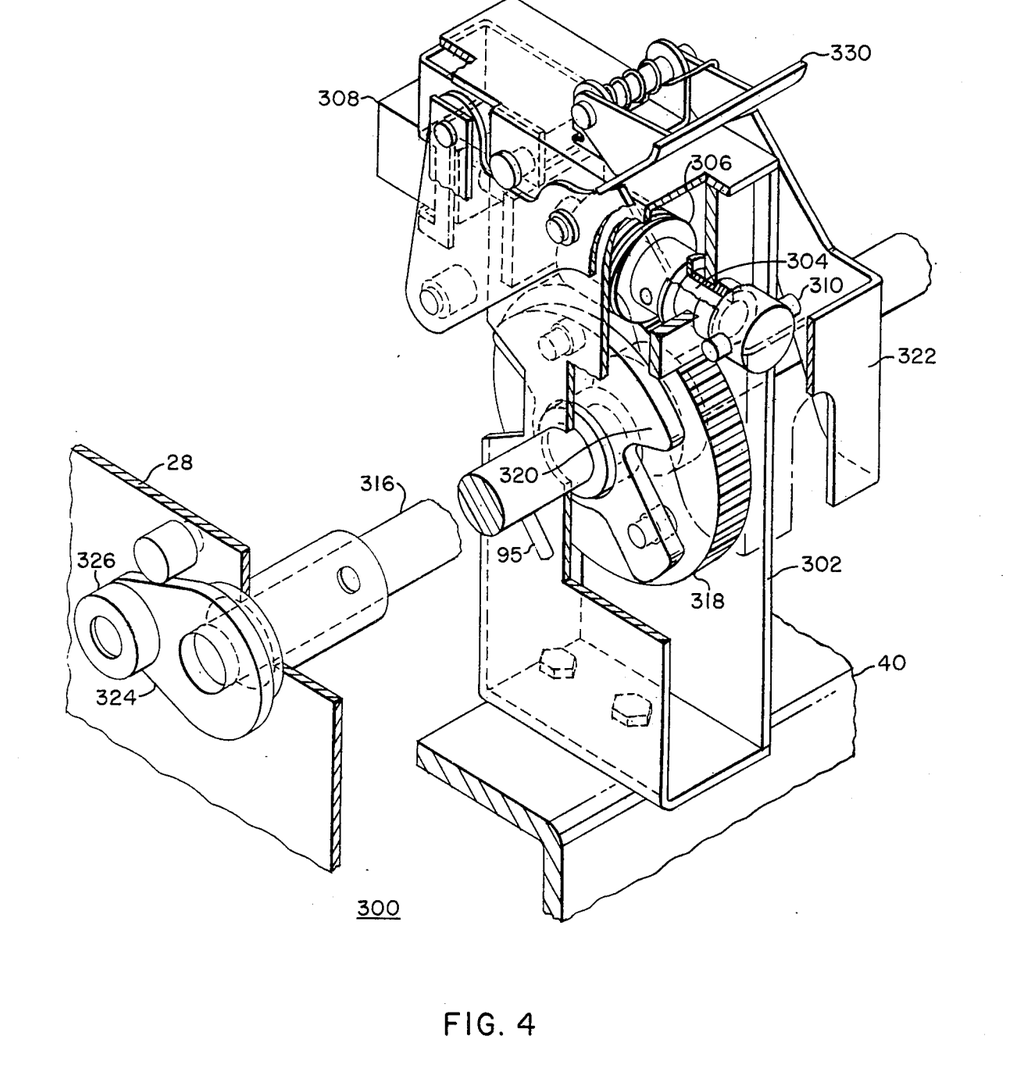
FIG. 4 is a perspective view of the lever assembly which operates the circuit breaker between connected and disconnected positions.
Figure 5:
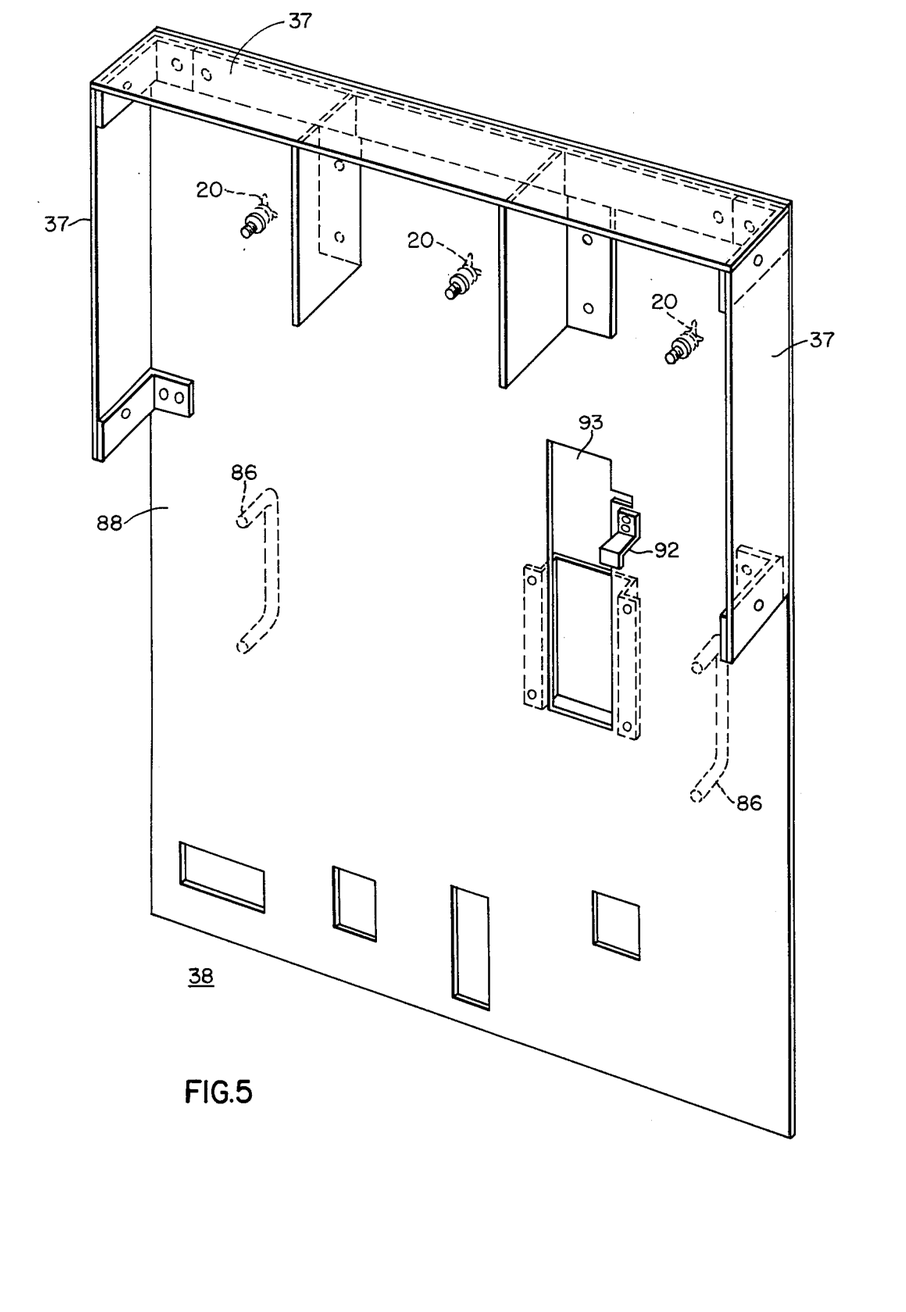
FIG. 5 is a rear perspective view of the protective barrier shown in FIG. 1.

A levering mechanism 300, shown most clearly in FIG. 4, is employed to operate the drawout unit 26 between engaged and disengaged positions. The levering mechanism 300 comprises a steel bracket 302 welded to the channel member 40 of the main support frame 27. A drive shaft 304 including worm gear 306 extends through the mounting bracket 302 in a direction perpendicular to the channel member 40. One end of the drive shaft 304 is threaded into a hole in a square traveling stop nut 308 which is located by a square aperture in the rear of the bracket 302. The end of the drive shaft 304 opposite the threaded end includes a pin 310 which can be engaged by a cooperating socket 312 at the end of the operating crank 314. A levering shaft 316 extends through both side support plates 28 and through the mounting bracket 302 in a direction perpendicular to the drive shaft 304. Mounted upon the levering shaft 316 within the mounting bracket 302 is a main gear 318 which is engaged by the worm gear 306. Also, mounted upon the levering shaft 316 is an interlock cam 320 which cooperates with a shutter 322 pivotally secured to the mounting bracket 302 to provide a safety interlock for the operating crank 314. The interlock is more completely described in the aforementioned U.S. Pat. Application Ser. No. 564,577, entitled "Drawout Type Circuit Interrupter with Interlocked Levering Mechanism". At each end of the levering shaft 316 is an engaging lever 324 containing a roller 326. The levers 324 and rollers 326 cooperate with J-shaped hooks 328 mounted upon the enclosure 12. Extending from the levering shaft 316 is a barrier interlock pin 95 which engages the bracket 92, as shown in FIG. 3, to hold the barrier 38. A spring-loaded pivot plate 330 is mounted at the top of the mounting bracket 302 and serves to prevent the raising of the shutter 322 unless lifted by the protective barrier 38, or otherwise displaced.

Figure 3A:
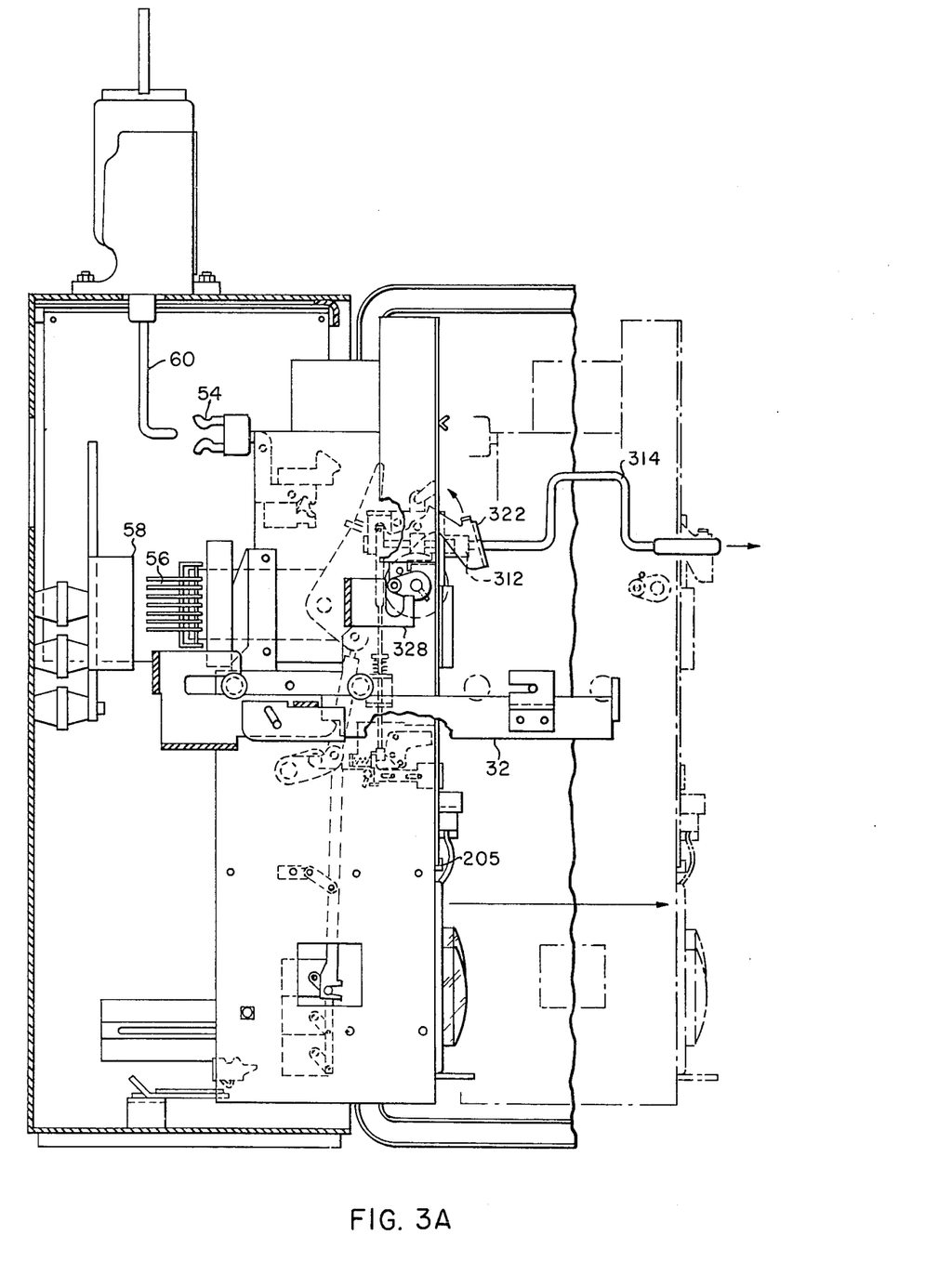
FIG. 3A is similar to FIG. 3, with the circuit breaker shown in a levered out disconnected position, and with dashed lines showing the circuit breaker completely rolled out upon extension rails.

In order to operate the drawout unit 26 from the disengaged fully rolled out position as shown in FIG. 1 to the fully engaged position as shown in FIG. 3, the drawout unit 26 is manually rolled back along the rails 32 into the enclosure 12 until the rollers 326 contact the rear edge of the J-shaped hooks as seen in FIG. 3A. In this position the disconnect structures 58 and 60 are still physically separated from the terminals 54 and 56. The shutter 322 is then raised to allow insertion of the operating crank 314 and engagement of the drive shaft 304. The crank 314 is then operated to cause counterclockwise rotation of the drive shaft 304. The attached worm gear 306 will also rotate in a counterclockwise direction to cause corresponding counterclockwise rotation of the levering shaft 316 and levers 324. The rollers 326 will move downward into the slot of the J-shaped hooks 328, pulling the drawout unit 26 into the enclosure 12.

Continued rotation of the operating crank 314 will cause continued rotation of the levers 324, pulling the drawout unit 26 into a completely engaged position within the enclosure 12. In this position, as shown in FIG. 3, the disconnect structures 58 and 60 engage the terminals 54 and 56. As the crank 314 is rotated, the traveling stop nut 308 is constrained by the square aperture in the mounting bracket 302 and is drawn inward along the threaded end of the drive shaft 304. When the drawout unit 26 reaches the fully engaged position, the threaded end of the drive shaft 304 contacts the bottom of the hole in the traveling stop nut 308, effectively preventing further rotation of the crank 314 and drive shaft 304.

As the levering mechanism is operated to pull the drawout unit into the interior of the enclosure, the levering shaft rotates causing the barrier interlock pin 95 to move upward under and behind the Z-shaped interlock bracket 92. The position of the protective safety barrier 38 when the drawout unit 26 is in the engaged position is shown in FIG. 3. Note that the barrier interlock pin 95 engages the interlock bracket 92 welded to the rear of the plate 88 to prevent the plate 88 from being tilted or moved to the right as shown in FIG. 3. The extension of the shutter through the aperture 93 and the position of the lower edge of the plate 88 within the lip 205 of the mechanism bottom pan 204 prevent vertical movement of the plate 88. Thus, it is not possible to remove the barrier 38 when the drawout unit 26 is in the engaged levered-in position as shown in solid lines in FIG. 3 even if the quarter-turn fasteners 20 are released. The protective barrier 38 and enclosure 12 together prevent any access to components of the interrupter module 48 which are at high potential when the drawout unit 26 is in the engaged position.

Figure 6:
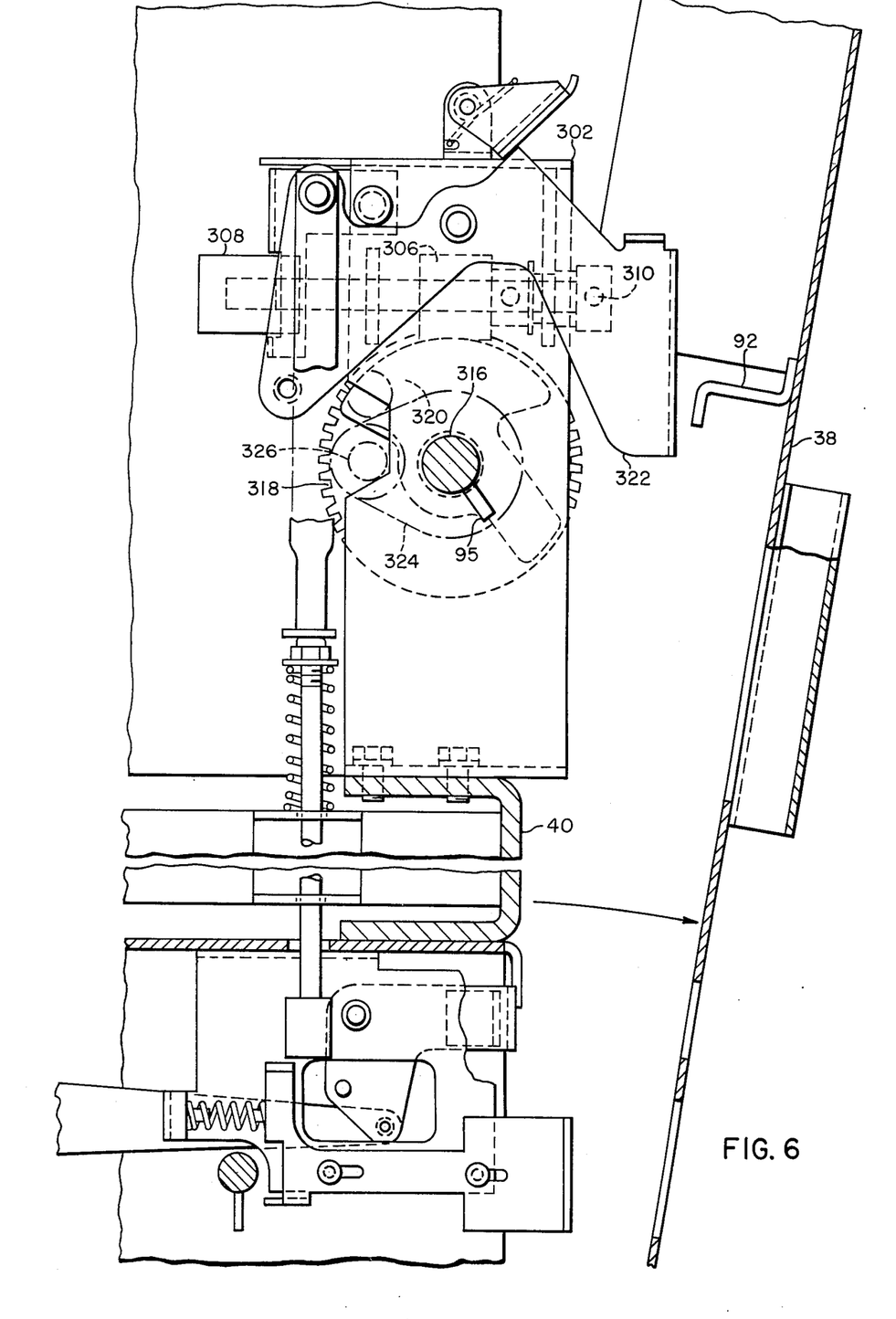
FIG. 6 is a detail sectional view of the levering mechanism with the barrier shown partially removed.

Operation of the levering mechanism as previously described, will move the drawout unit 26 from the engaged position shown in FIG. 3 to the disengaged position shown in FIGS. 3A and 6. Note that the barrier interlock pin 95 is rotated by the levering shaft in a clockwise direction to release the interlock bracket. When the quarter-turn fasteners 20 are released, the barrier 38 can then be tilted downward and outward as shown in FIG. 6 and lifted from the lip 205 to expose the interrupter module 48 and mechanism module 50, as shown in FIG. 2.

As can be seen in FIGS. 2 through 6, the pivot plate 330 is mounted upon the levering mechanism to remind operating personnel to replace the barrier 38 before operating the levering mechanism to move the drawout unit to the engaged position. In order to do this it is necessary to insert a crank by raising the shutter. The shutter 322 is prevented from being raised by the pivot plate 330 unless the pivot plate 330 is pivoted upward out of the path of rotation of the shutter. This raising operation is automatically performed when the barrier 38 is fastened to the drawout unit 26. The pivot plate 330 can also be manually tilted out of the way to allow raising of the shutter and insertion of the crank. However, this requires a conscious effort by maintenance personnel and protects against the inadvertent levering in of the drawout unit without mounting of the protective barrier 38.

The protective barrier 38 and enclosure 12 prevent access to components of the interrupter module 48 when the drawout unit 26 is in a levered in engaged position. This removes any possibility of maintenance personnel coming in contact with components of the network protector 10 at high potential. It can be seen therefore that the invention provides an enclosed circuit interrupter exhibiting increased safety for operating and maintenance personnel.

We claim:

1. A drawout type circuit interrupter, comprising:
an enclosure;
load terminals connected to an electrical load;
line terminals connected to a source of electrical energy at high potential;
a drawout unit movably mounted within said enclosure and comprising a levering mechanism for moving said interrupter unit between connected and disconnected positions, said drawout unit comprising separable contacts bridging said load and line terminals and placing high potential upon components of said drawout unit when said drawout unit is in a connected position;
a vertical upstanding protective barrier of conductive material removably attached to said drawout unit; said barrier, when attached, being at ground potential and preventing all access to components at high potential; and
interlock means comprising catch means attached to said barrier and engaging means attached to said levering means, said engaging means mechanically capturing said catch means when said drawout unit is in any position other than a fully disconnected position, thereby preventing removal of said barrier when said drawout unit is in any position other than a fully disconnected position.

2. A drawout type circuit interrupter as recited in claim 1 wherein said levering mechanism comprises a rotatable levering shaft, said engaging means comprises an interlock pin extending at an angle from said levering shaft, and said catch means comprises a bracket extending from the inner surface of said barrier and comprising a member substantially parallel to and spaced away from said barrier, operation of said levering mechanism to move said drawout unit from a disconnected to a connected position causing rotation of said levering shaft and interpositioning of said interlock pin between said parallel member and the inner surface of said barrier to substantially prevent movement of said barrier in a direction away from said drawout unit.

3. A drawout type circuit interrupter as recited in claim 2 wherein said drawout unit comprises angular support means pivotally supporting the lower edge of said barrier, said levering means comprises means extending outward from said drawout unit, and said barrier comprises aperture means through which said extending means protrudes when said interlock pin is interpositioned between said bracket and said barrier; said support means, said extending means, and said aperture means substantially preventing vertical movement of said barrier with respect to said drawout unit, while said interlock pin, said bracket, and said support means substantially prevent horizontal movement of said barrier with respect to said drawout unit, whereby said barrier is captured against said drawout unit and said barrier prevents all access to components at high potential; operation of said levering mechanism to move said drawout unit from a connected to a disconnected position causing said interlock pin to be rotated away from a position between said barrier and said bracket, thereby allowing said barrier to be pivoted about said support means to move said aperture out of engagement with said extending means and permitting said barrier to be removed.

* * * * *